United States Patent [19]

Maalouf

[11] E Re. 30,116

[45] Reissued Oct. 16, 1979

[54] CARBONLESS MANIFOLD BUSINESS FORMS

[75] Inventor: George E. Maalouf, Niagara Falls, N.Y.

[73] Assignee: Moore Business Forms, Inc., Niagara Falls, N.Y.

[21] Appl. No.: 829,826

[22] Filed: Sep. 1, 1977

Related U.S. Patent Documents

Reissue of:

[64] Patent No.: 3,981,523
Issued: Sep. 21, 1976
Appl. No.: 561,623
Filed: Mar. 24, 1975

[51] Int. Cl.[2] ..... B41M 5/22

[52] U.S. Cl. ..... 282/27.5; 427/150; 427/151; 428/307; 428/914

[58] Field of Search ..... 282/27.5; 427/146, 150, 427/151, 152, 153, 261; 428/307, 323, 411, 537, 913, 914; 106/21

[56] References Cited

U.S. PATENT DOCUMENTS

| | | | |
|---|---|---|---|
| 3,540,912 | 11/1970 | Lin | 427/261 |
| 3,895,173 | 7/1975 | Adachi | 428/537 |
| 3,981,523 | 9/1976 | Maalouf | 282/27.5 |

FOREIGN PATENT DOCUMENTS

| | | | |
|---|---|---|---|
| 1213142 | 11/1970 | United Kingdom | 282/27.5 |

*Primary Examiner*—George F. Lesmes
*Assistant Examiner*—Bruce H. Hess
*Attorney, Agent, or Firm*—Watson, Cole, Grindle & Watson

[57] ABSTRACT

Sets of manifold business forms are coated on selected surfaces thereof with chemicals which are capable of reacting with each other to produce a colored mark. In one arrangement at least one intermediate sheet is coated on one surface with a composition of a record-developing material (which is generally solid) and a non-compatible color precursor (which is generally in the form of a microencapsulated liquid) to thereby function as both a record-receiving and a color-transfer surface upon reacting with the coating of at least another separate sheet of the set containing another compatible color precursor and/or another record-developing material on the surface thereof. In another arrangement, some of the sheets are coated front and back with a record-developing material, while others are coated front and back with a microencapsulated color precursor. In each of the arrangements the sheets of the manifolded sets are capable of being so arranged such that by removal of certain parts of the sets or turning certain parts upside down and applying pressure on the backs of the sets, images may be developed on both sides of the sheets.

8 Claims, 8 Drawing Figures

10
10A
20
20A
70
71
72
73
24
26
32
34
11
12
13
14
15
16
17
21a
21b
28
29
31
33
35
78a
78b
180
190
210
25
27
19a
19b 30
74
45
36
18a
38
44a
46
18c
39
18d
41
44b
46
18e
42
18f
43
44c
46
18b
37

30A
75
47
37
46
18b
43
44c
48
18f
42
46
18e
41
44b
48
18d
39
46
18c
38
44a
48
18a
36
45

40
76
52
44d
49
44e
53
18g
51
18h 40A
77
54
44e
49
52
44d
55
18h
51
18g
53

CARBONLESS MANIFOLD BUSINESS FORMS

Matter enclosed in heavy brackets [ ] appears in the original patent but forms no part of this reissue specification; matter printed in italics indicates the additions made by reissue.

BACKGROUND OF THE INVENTION:

1. Field of the Invention:

The present invention relates generally to a carbonless copying system wherein mating sheet surfaces are coated respectively with compatible initially colorless reactive components capable of reacting to produce a colored mark upon impact. More particularly, the invention relates to manifold sets utilizing both single and dual initially colorless color forming systems whereby it is possible to produce a colored mark on both sides of such sheets by impact.

2. Description of the Prior Art:

Manifolded sets of carbonless copying paper normally comprise a top sheet, a bottom sheet and at least one intermediate sheet disposed therebetween. The top sheet which is conventionally coated on its back surface with an encapsulated solution of a colorless color-former in a suitable solvent and is generally therefore referred to as CB ("Coated Back") paper. The bottom sheet conventionally has its front surface coated with a solid material containing a record-developing material and this "front coated" sheet is generally referred to as CF paper. The intermediate sheets are often coated respectively with the above-mentioned solid record-developing material in the front coatings and with the color precursor in the back coatings and accordingly such "front and back coated" sheets are referred to as CFB paper. The back coatings normally comprise pressure rupturable microcapsules containing a fluid color precursor in fluid form which is capable of reacting to thereby form a colored compound with the developing material in the front coating of the next adjacent sheet so that, upon impact by a machine key or application of pressure by a stylus on the top sheet, the contents of the ruptured capsules in the back coatings spill out and react with the developing material to form a colored mark on the latter which corresponds to the mark impressed by the stylus or machine key.

The present invention relates generally to a co-pending and commonly owned U.S. application Ser. No. 466,910, filed May 3, 1974, and entitled "DUAL SYSTEM CARBONLESS PAPER", now abandoned the entirety of the disclosure of which is hereby specifically incorporated herein by reference. In this regard it is to be noted that the present application also relates to dual systems of co-reactive materials; however, the present invention differs from that of the above-mentioned application in its construction and purpose as will be more clearly brought out hereinafter.

Although, in conventional manifolded carbonless copying sets, the back coatings normally comprise a microencapsulated solution of the color precursor and the front coatings normally comprise a solid record-developing material, it should be pointed out that the reverse is also possible so that the front coatings comprise microcapsules and the back coatings comprise a solid record-developing material. Moreover, the co-reactants may both be microencapsulated liquids. United States patents which illustrate various types of systems which may be used in the production of carbonless transfer papers are, for example, U.S. Pat. No. 2,299,694 to Green, U.S. Pat. No. 2,712,507 to Green, U.S. Pat. No. 3,016,308 to Macaulay, U.S. Pat. No. 3,429,827 to Ruus and U.S. Pat. No. 3,720,534 to Macaulay et al.

The aforementioned Green ('507) and Macaulay ('308) patents illustrate the most common variety of carbonless impact transfer paper of the type with which the present invention is primarily concerned wherein microcapsules containing a liquid fill comprising a chemically reactive color-forming precursor are coated on the back surface of a sheet, and a dry coating of a solid coreactant chemical for the precursor is coated on the front surface of a receiving sheet.

In the current carbonless copying systems of the type aforedescribed the image is usually developed on the front sides of the sheets. In certain cases, however, it is desirable and advantageous for images to be produced on both sides of several or all sheets of a set of manifold business forms. Depending on the particular business needs, various types of entries are required to be made on the sheets of a manifolded set of forms thereby requiring larger and more detailed sets of forms to be made which results in the need for more paper and precise printing techniques. Carbon transfer sheets have sometimes therefore been interleaved with carbonless paper systems so that, after an image is produced on the front side of the receiving sheet using the carbonless system, an image can also be produced on the back side of such receiving sheet by means of the conventional carbon transfer. The problems of carbon smudging, poor manifolding and difficulty in manufacture nevertheless persist in such an arrangement.

An interesting prior reference is Japanese patent publication No. 43-28652. This patent discloses a carbonless duplicating notebook consisting of a set of initially colorless copying sheets containing pressure rupturable components for transfer of the color forming ingredients. The patent is basically directed to a base sheet having a first color forming reactant on each side thereof. A plurality of secondary sheets are provided each of which has one side thereof coated with a second color forming reactant reactable with the first color forming reactor to form a color and the second side thereof coated with the first color forming reactant. Sets are formed by placing the secondary sheets on either side of the base film with the second color forming reactant coated surfaces facing the first color forming reactant surfaces. However, this patent does not generally disclose the concept of having an image produced on each side of the sheets of the set.

SUMMARY OF THE INVENTION

It is therefore an object of the present invention to provide a completely carbonless manifolded set of recording sheets so constructed to permit an image to be developed on both sides of the sheets.

Another object of this invention is to provide such a manifolded set wherein individual sheets may be coated with a mixture of a microencapsulated color precursor and a record-developing material which is non-compatible therewith. By itself such a coating cannot present a so-called self-contained sheet since image development cannot occur if such capsule contents and the record-developing material come into contact. However, such sheet can act both as a record-receiving CF sheet and as a color-transfer surface CB sheet. Image development may then be provided by using separate sheets coated with a compatible color precursor or record-developing material.

A further object is to provide a manifolded set wherein each sheet is coated both front and back with a record-developing material and/or with a microencapsulated color precursor.

A still further object of the present invention is to provide such a manifolded set wherein a chemically compatible reaction system is employed using color precursors and record-developing coatings disposed on selected surfaces of the sheets to facilitate development of an image on both sides of the sheets.

A still further object is to provide a manifolded set wherein two reaction systems are employed such that the color precursor of one system is chemically incompatible to develop a color with the record-developing material of the other, and vice versa, although the various components of both systems may be coated on selected surfaces of the sheets and/or as a mixture on selected surfaces so as to facilitate a wide range of manifolded transfer paper sets capable of producing images on both sides of the sheets.

Other objects, advantages and novel features of the invention will become more apparent from the following detailed description of the invention when taken in conjunction with the accompanying drawings.

BRIEF DESCRIPTION OF THE DRAWINGS:

FIGS. 1 through 4 are elevational, expanded and enlarged, cross-sectional views of several embodiments of manifolded sets of carbonless recording sheets embodying the principles and concepts of the present invention; and FIGS. 1A through 4A are views similar to FIGS. 1 to 4, respectively, showing the arrangement of the sheets for each embodiment to facilitate image development on the opposite sides thereof.

Figures 1, 1A, 2, 2A:
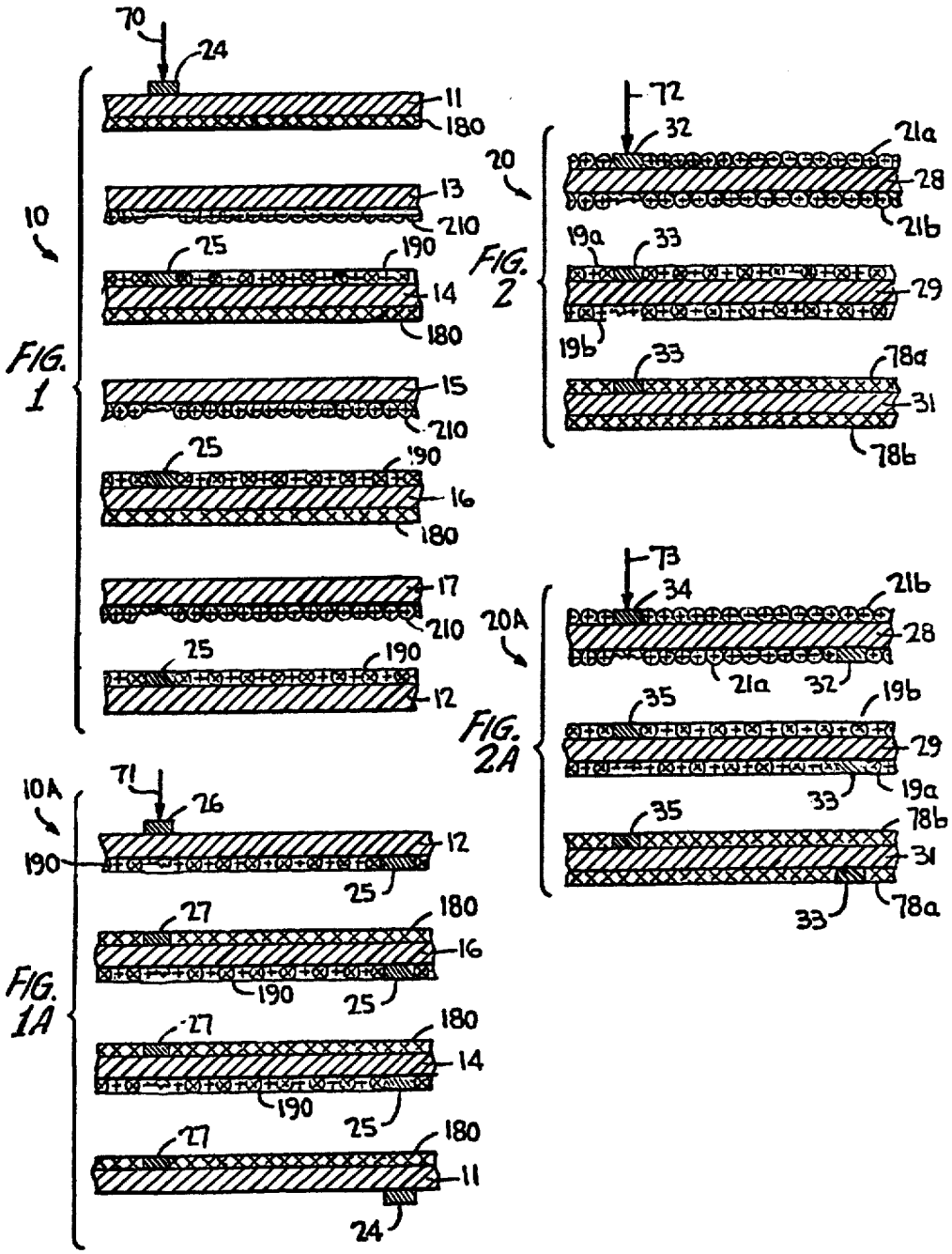

DESCRIPTION OF THE PREFERRED EMBODIMENTS:

The manifolded set of carbonless recording sheets generally designated by the reference numeral 10 in FIG. 1 includes a top sheet 11, a bottom sheet 12 and several intermediate sheets 13 through 17. The top and bottom sheets 11 and 12 are respectively coated back and front with coatings 180 and 190, while intermediate sheets 13, 15 and 17 include back coatings 210. Intermediate sheets 14 and 16 each include front coatings 190 and back coatings 180. As shown, each of the sheets 11 through 17 are disposed to overlie one another with their back coatings and front coatings therethroughout normally in contact with one another in the manifolded set, although these sheets are shown as being vertically spaced in FIG. 1 for the sake of clarity. Each of the coatings 180, 190 and 210 includes at least one color-forming reactive material, and the reactive material in each of the back coatings 210 is capable of reacting with a reactive material in each of the front coatings 190, when pressed thereagainst, to produce a colored mark in a manner to be more fully described hereinafter. The reactive material in each coating 180 is capable of reacting with a reactive material in each of the coatings 190 when arranged as shown in FIG. 1A for contact therewith, in a manner to be hereinafter more fully described. However, the reactive materials in coatings 180 and 210 are chemically incompatible to form a color.

Although five intermediate sheets are shown in FIG. 1, it should be pointed out that set 10 could include additional intermediate sheets similar to 14 or 16 and 13, 15 or 17, and could likewise include as few sheets as 11, 13 and 12 without departing from the principles and concepts of the present invention.

The reactive material in each coating 210 comprises a first initially colorless reactive component of a first initially colorless reaction system. The reactive material in each coating 190 comprises a mixture of a second initially colorless reactive component of the first reaction system and a first initially colorless reactive component of a second reaction system. Further, the reactive material in each coating 180 comprises a second initially colorless reactive component of the second reaction system. The first and second components of the first system are capable of interreacting when brought into reactive contact with one another, such as by impact, to produce a colored mark. Likewise, the first and second reactive components of the second system are capable of interreacting when brought into reactive contact with one another to produce a similar colored mark. On the other hand, the second reactive component of the second reactive system in coatings 180 is not chemically compatible to produce a colored mark when brought into contact with the first reactive component of the first reactive system in coatings 210. Further, the second component of the first reactive system and the first reactive component of the second reactive system in coatings 190 are not chemically compatible to form a colored mark.

Generally the reactive components of coatings 210 will be identical. However, it should be pointed out, that the use of a third reaction system is possible in that the reactive material in coating 210 of sheet 17 might be chemically compatible only with a reactive component of the mixture of components in the coating 190 of sheet 12, and not compatible, for example, with a reactive component of the mixture of components in coating 190 of intermediate sheets 14 and/or 16. Similarly, sets including more than three different color systems could be utilized in connection with the present invention.

FIG. 1 illustrates the manner in which images are transferred onto a surface of several sheets underlying top sheet 11 as pressure is applied thereto in the direction of arrow 70. Preferably, at least one of the mixture of components in coatings 190 is contained in the form of a liquid fill material in tiny rupturable microscopic capsules. This fill comprises the first reactive component of the second reactive system described above. The tiny rupturable microcapsules are illustrated as small circles. Likewise, coatings 210 preferably comprise tiny rupturable microscopic capsules having liquid fill therein, which fill comprises the first reactive component of the first reactive system. Such microcapsules are also illustrated by small circles. When the capsules in coatings 210 are ruptured, by the application of pressure by stylus or machine key to the upper surface of sheet 11, as indicated by the arrow 70 in FIG. 1, a mark 24 may immediately be impressed on top sheet 11 of the set and corresponding marks 25 are formed on the upper surfaces of sheets 14, 16 and 12 as the fill from coatings 210 of sheets 13, 15 and 17 spills out of these ruptured capsules to contact and co-react with the second reactive component of the first reaction system contained in the mixture of reactive components of coatings 190 of corresponding underlying sheets 13, 15 and 17. Obviously, since the top surfaces of intermediate sheets 13, 15 and 17 are uncoated, no mark is left on these surfaces.

Throughout the drawings, the encapsulated first reactive component of the first reactive system is illustrated as a series of small circles containing a plus mark ⊕ while the first reactive component of the second reactive system is illustrated as a series of small circles containing an x mark ⊗. The second reactive component of the first reaction system is illustrated as a series of plus marks (+), while the second reactive component of the second reaction system is illustrated as a series of x marks (x).

For producing images on the opposite surfaces of sheets 14, 16 and 12 which have been marked, as described above, sheets 13, 15 and 17 are removed and the set is turned over to form a set 10A illustrated in FIG. 1A wherein sheet 12, which was previously the bottom sheet, is now the top sheet for receiving an impact as illustrated by the arrow 71 in FIG. 1A. Now, coatings 180 containing the second reactive component of the second reactive system respectively underlie and are in contact with coatings 190 of sheets 12, 16 and 14 which include the first reactive component of the second reaction system. Upon impact by a stylus or machine key in the direction of arrow 71 as shown in FIG. 1A, a mark 26 is immediately impressed on the surface of sheet 12 and the capsules containing a first reactive component of the second reactive system are ruptured so that the liquid fill thereof spills out to contact and co-react with the second reactive component of the second reactive system contained in corresponding coatings 180. Therefore, images or marks 27 are produced on the coatings 180 of the corresponding underlying sheets 16, 14 and 11. Sheet 12 of set 10A therefore has marks 25 and 26 on opposite sides thereof, each sheet 14 and 16 has marks 25 and 27 on opposite sides thereof and sheet 11 has marks 24 and 27 on its opposite sides.

In FIG. 2, manifold set 20 comprises a top sheet 28, a bottom sheet 31 and an intermediate sheet 29. The top sheet is coated on its front and on its back with coatings 21a and 21b, each of which contains the first reactive component of the first reactive system. Bottom sheet 31 has coatings 78a and 78b on its opposite sides, each of which contains the second reactive component of the second reactive system. Intermediate sheet 29 carries coatings 19a and 19b on its respective opposite sides. Each coatings 19a and 19b comprises an admixture of the second reactive component of the first system and the first reactive component of the second reactive system, which components are not chemically compatible to react to produce a color. The pressure of a stylus or machine key impressed on the top surface of sheet 28 in the direction of arrow 72 immediately imprints a mark 32, the image of which is transferred onto the top surfaces of underlying sheets 29 and 31 as markings 33. The sheets of set 20, similarly, as in the earlier described embodiment, are actually in face-to-face contact, and the fill comprising the first component of the first system which is contained within the microcapsules of coating 21b is spilled from the ruptured capsules upon impact by the key or stylus so as to contact and co-react with the second reactive component of the first reaction system in the upper coating 19a of sheet 29. Likewise, the microcapsules which contain the first reactive component of the second reactive system and which are admixed in the coating layer 19b on the lower surface of sheet 29 are ruptured upon impact by the key or stylus so that the fill contained therein spills out to contact and co-react with the reactive material comprising the second component of the second system in upper coating 78A of bottom sheet 31.

For producing images on the reverse sides of the sheets, each sheet 28, 29 and 31 is turned upside down to present the set 20A of FIG. 2A. A mark 34 is then impressed directly upon the now upper layer 21b of the form by a stylus or machine key applying pressure in the direction of the arrow 73. An image 35 of the mark is created on surface 19b of sheet 29 as the first reactive component of the first reaction system of coating 21a spills from the ruptured microcapsules to contact and co-react with the second reactive component of the first reaction system in coating 19b. As before, microcapsules in coating 19a are ruptured upon impact, and the contents thereof comprising the first component of the second system spills out to contact and co-react with the chemically compatible second component of the second system in coating 78b of sheet 31 thereby forming another mark 35. Accordingly, sheet 28 has marks 32 and 34 on opposite surfaces thereof while sheets 29 and 31 have markings 33 and 35 on opposite surfaces thereof.

Figures 3, 3A, 4, 4A:
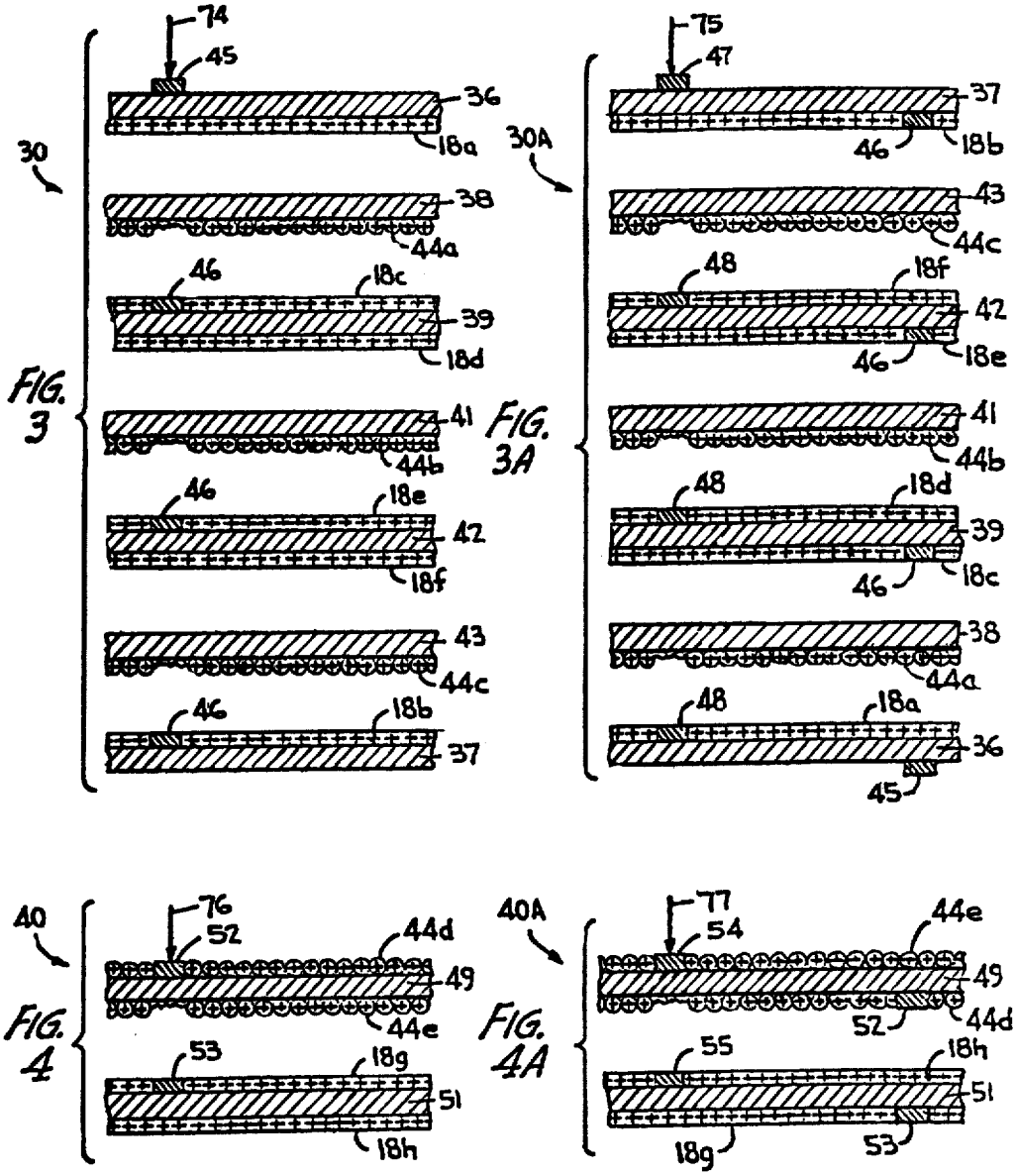

In the FIG. 3 embodiment, a manifolded set 30 of carbonless paper sheets is shown as comprising a top sheet 36, a bottom sheet 37 and intermediate sheets 38 through 43 lying therebetween. Again, each of the sheets are in face-to-face contact with one another; however, the same are shown as being spaced for improved clarity. Here, sheet 36 has a back coating 18a, sheet 37 has a front coating 18b, sheet 39 has coatings 18c and 18d on opposite sides thereof, and sheet 42 has coatings 18e and 18f on opposite sides thereof. Each of the coatings 18a through 18f comprise the second reactive component of the first reaction system. Intermediate sheets 38, 41 and 43 respectively have back coatings 44a, 44b and 44c thereon comprising microcapsules containing the first reactive component of the first reaction system. Therefore, upon impact by a stylus or machine key in the direction of the arrow 74, a mark 45 is impressed on the upper surface of sheet 36, microcapsules containing the reactive component in coating 44a are ruptured and co-react with the reactive component in coating 18c whereby the reactive component spills out to contact therewith. Likewise, the reactive components from coatings 44b and 44c react with the reactive components in layers 18e and 18b respectively. Images 46 of the mark are thereby produced on each of sheets 39, 42 and 37. Since the top surfaces of sheets 38, 41 and 43 are uncoated, no image is transferred onto these surfaces. It should be appreciated that the sheets of set 30 in FIG. 3 have been described as containing the co-reactants of the first system only; however, they could similarly be likewise coated in a similar manner with the co-reactants of another initially colorless color forming system. Moreover, additional intermediate sheets constructed in the same manner as sheets 42 and 43 could be used with this set, and, as few as three sheets, such as, for example, sheets 36, 38 and 37 could be used without departing from the teachings of the invention shown by this embodiment.

To facilitate a transfer of images on the reverse sides of the marked sheets of FIG. 3, sheets 38, 41 and 43 are first turned upside down and thereafter the entire manifolded set is likewise turned upside down to present set 30A useful for marking the reverse sides of sheets 37, 42, 39 and 36 as shown in FIG. 3A. Here, upon impact with what is now the upper surface of sheet 37 by means of a stylus or machine key in the direction of arrow 75, a mark 47 is immediately impressed upon sheet 37 and images 48 thereof are transferred to sheets 42, 39 and 36 respectively as the microcapsules in coatings 44c, 44b 44a are ruptured whereby the fill thereof spills out to contact and react with the co-reactive components in the respective underlying coatings 18f, 18d and 18a. As a result, sheet 37 has marks 46 and 47 on its opposite sides while the opposite sides of sheet 36 have marks 45 and 48 thereon. Each of the intermediate sheets 42 and 39 has marks 46 and 48 on its opposite surfaces.

Manifolded set 40 shown in FIG. 4 makes use of only a single system of co-reactants. Top sheet 49 has coatings 44d and 44e on its opposite surfaces comprising capsules containing the first reactive component of the reaction system while bottom sheet 51 has coatings 18g and 18h on its opposite surfaces comprising the second reactive component of the reaction system. A mark 52 may be impressed upon the surface of layer 44d of sheet 49 by means of a stylus or machine key moving in the direction of the arrow 76, and such mark is imaged as mark 53 on the top surface of sheet 51 as the microcapsules in coating 44e rupture and the fill thereof spills out to contact and co-react with the co-reactive component in coating 18g of sheet 51.

Sheets 49 and 51 are then separately turned upside down so that coating 44d and 18h are facing one another to thereby present set 40A as illustrated in FIG. 4A, to facilitate the production of markings on the opposite sides of the sheets 49 and 51. The co-reactants in the contacting coatings 44d and 18h of the sheets co-react to produce an image 55 on sheet 51 as a mark 54 is impressed on sheet 49 by a stylus or machine key applying pressure in the direction of the arrow 77. Again, the microcapsules in coating 44d rupture so that the fill contained therein spills out to contact and co-react with the co-reactive material in coating 18h.

It should be pointed out that in each of the embodiments wherein one or more sheets or sets are turned upside down, the turning takes place about an axis perpendicular to the plane of the drawings.

The precursors useful in connection with carbonless copying systems are varied and known to those having ordinary skill in this art. As an example, particular reference is made to the color precursors mentioned in U.S. Pat. No. 3,455,721 to Phillips, Jr. et al, and particularly to those listed in the paragraph bridging columns 5 and 6 thereof. These materials are capable of reacting with a CF coating containing an acidic material such as the acid-leached bentonite-type clay disclosed in a commonly owned U.S. Application of Baxter, Ser. No. 125,075, filed Mar. 17, 1971 (the entirety of which is hereby specifically incorporated by reference), or the acid-reactant organic polymeric material disclosed in the Phillips, Jr., et al '721 patent. It should be pointed out also that there are a great number of patents which relate to initially colorless color precursors useful in connection with carbonless copying systems. The present invention in no way depends on the exact identity or nature of the reactants utilized except that at least one system of co-reactants is required for two of the presently disclosed embodiments, and that at least two non-compatible systems of co-reactants are required for another two of the disclosed embodiments. When a single system is used, the two co-reactants are of course chemically compatible to produce a color. Where two systems are utilized, the first reactive component of the first reaction system must be chemically incapable of reacting with the second reactive component of the second reaction system to produce a color and the first reactive component of the second reaction system must likewise be chemically incapable of reacting with the second reactive component of the first reaction system to produce a color. Manifestly the first and second reactive components of the first system are chemically reactive to form a color and likewise the first and second reactive components of the second reaction system are chemically reactive to form a color.

For one of these systems, any of the materials disclosed in the '721 patent referred to above, which are capable of undergoing an acid-base type reaction with an acidic material, may be utilized. Also operable in connection with this first system are the spirodipyran compounds disclosed in the U.S. Pat. No. 3,293,060 to Harbort, with specific reference being made to the disclosure of this patent in column 11, line 32 through column 12, line 21. Particularly useful color precursors are disclosed in the patents to Davis, U.S. Pat. Nos. 3,193,404, 3,278,327 and 3,377,185. The color precursors of Harbort as well as those of Phillips, Jr. et al and Davis are initially colorless and are capable of becoming highly colored when brought into contact with an acidic material such as an acid activated bentonite clay or an acid-reacting polymeric material, or the like. The Harbort, Phillips, Jr. et al and Davis disclosures are specifically incorporated herein by reference, although there are any number of similar color precursors capable of undergoing a reaction with an acidic coating to produce a color which are usable herewith.

In general, the color precursor materials of the Phillips, Jr. et al, the Harbort and the Davis patents may be dissolved in a solvent and the solution may be encapsulated as taught in the Macaulay '308 and the Green '507 patents mentioned hereinabove. Other processes for encapsulating color precursors are disclosed in U.S. Pat. No. 3,429,827 to Ruus and in U.S. Pat. No. 3,578,605 to Baxter. In this connection, it should be pointed out that the exact nature of the capsule itself is not critical so long as the same is capable of containing the color precursor with the capsules capable of being ruptured upon impact in accordance with the conventional carbonless copying procedures. Solvents which are useful in connection with dissolving color precursors include chlorinated biphenyls, vegetable oils (castor oil, coconut oil, cottonseed oil, etc.) ester (dibutyl adipate, dibutyl phthalate, butyl benzyl adipate, benzyl octyl adipate, tricresyl phosphate, trioctyl phosphate, etc.), petroleum derivatives (petroleum spirits, kerosene, mineral oils, etc.), aromatic solvents (benzene, toluene, etc.) silicone oils, or any combinations of the foregoing. Particularly useful are the alkylated naphthalene solvents disclosed in U.S. Pat. No. 3,806,463 to Konishi et al.

With regard to the acidic coatings capable of converting the color precursors into their highly colored form, particular reference is made to the clay coatings disclosed by Baxter in application Ser. No. 125,075 referred to above.

In each of the above mentioned color-forming systems, it is conventional for the color precursors to be contained in pressure rupturable microcapsules which are coated on the backs of the sheets of carbonless copying manifolded sets. Also, the acidic coatings are normally coated on the fronts of the sheets with the color precursor material in a solvent therefor being transferred from an adjacent back coating to the acidic layer front coating upon rupture of the adjacent capsules which contain the color precursor material.

For examples of a second initially colorless reaction system wherein the reactive components are chemically non-reactive with the acid-base type reactants of the systems, described above, reference is made to the patents to Ostlie, U.S. Pat. No. 3,481,759, Matson, U.S. Pat. No. 3,516,846 and Matson, U.S. Pat. No. 3,516,941. The systems disclosed in these patents include a dithiooxamide compound as one component and a metal rosinate, particularly nickel rosinate, as the other component. In general, the dithiooxamide material is incorporated into a suitable solvent therefor, such as cyclohexane, and is microencapsulated. The rupturable microcapsules containing the dithiooxamide fill material are then utilized as the back coating in a carbonless copying system. The metal rosinate salt in used as a front coating and the two materials react to present a clear mark. The color systems disclosed in the Ostlie '759 and in the Matson '846 and '941 patents referred to above are quite useful in connection with the present invention in combination with the systems disclosed in the Phillips, Jr. et al '721, the Harbort '060 and the Davis '404, '327 and '185 patents in view of the fact that the Phillips, Jr. et al, the Harbort and the Davis color precursors are not reactable with matallic rosinates to form a color and the dithiooxamides of Ostlie and Matson are not reactable with acidic layers, such as of acid-leached bentonite-type clay or acidic polymeric materials, for image development. Other patents which disclose dithiooxamide color-forming systems are U.S. Pat. Nos. 3,287,154, 3,437,677 and 3,558,341.

Other initially colorless color forming systems which may be useful in connection with the present invention include an alkali metal gallate-iron lactate salt system as disclosed in U.S. Pat. No. 2,870,040; a system wherein an acid ester substituted polyhydric phenol is reacted with an iron or vanadium compound to produce a highly colored chelated compound as disclosed in U.S. Pat. No. 3,535,139; a system wherein an organovanadium compound is reacted with an aromatic hydroxy compound as disclosed in U.S. Pat. Nos. 3,592,677 and 3,632,617; systems wherein phloroglucinol, 3-hydroxyphenyl urea, aniline hydrochloride, 4-aminophenylglycine hydrochloride. N,N-dimethyl-p-phenylenediamine hydrochloride, 3-aminopyridine, skatole, 3,4-dimethyl-5-pyrazolone, 2-methylindole, or cobalt thiocyanate is reacted with lignin to form a visible reaction product as disclosed in U.S. Pat. No. 3,450,553; and systems wherein an alkali metal or ammonium iodide solution is applied to a surface containing a color forming iodine-reactive substance and an agent for releasing iodine from the iodine solution, as disclosed in U.S. Pat. No. 3,677,786. Another system which has been found to be operable in accordance with the present invention in connection with a Lewis acid-Lewis base reaction system is a system wherein diphenyl carbazide is reacted with nickel stearate.

With respect to the specific embodiments of the present invention, coatings 210 in FIGS. 1 and 1A, coatings 21a and 21b in FIGS. 2 and 2A and coatings 44a through 44e in FIGS. 3, 3A, 4 and 4A may include microcapsules containing a fill material comprising, as the first initially colorless reactive component of a first initially colorless reaction system, a color precursor selected from among those disclosed in U.S. Pat. Nos. 3,455,721, 3,293,060, 3,193,404, 3,278,327, and 3,377,185 discussed above. Coatings 190 of FIGS. 1 and 1A, coatings 19a and 19b of FIGS. 2 and 2A and coatings 18a through 18h of FIGS. 3, 3A, 4 and 4A may include, as the second reactive component of such first reaction system, a color-forming reactive material such as the acid-treated bentonite-type clay disclosed in Baxter's application Ser. No. 125,075 or the acidic polymeric materials disclosed in U.S. Pat. No. 3,455,721.

Coatings 190 of FIGS. 1 and 1A and coatings 19a and 19b of FIGS. 2 and 2A may also comprise, in admixture with the acidic reactive components, microcapsules containing a liquid fill including, as the first initially colorless reactive component of a second initially colorless reaction system, a dithiooxamide material of the sort disclosed in U.S. Pat. Nos. 3,516,846 and 3,516,941 mentioned above. The second reactive component of the second reaction system is included in coatings 180 of FIGS. 1 and 1A and coatings 78a and 78b of FIGS. 2 and 2A. This component may comprise, for example, a metallic rosinate salt.

As pointed out earlier, it is critical to the invention that the first and second components of the first system be chemically compatible for image development and that the first and second components of the second system be likewise chemically compatible for image development. However, the first component of the first system and the second component of the second system must not be capable of reacting to form a color and likewise, the first component of the second system and the second component of the first system must not be capable of reacting to form a color. Other than this, the sole basis for choosing between one or another of the various chemical reactants disclosed above is the color desired in the final copy produced by the colorless copying system.

As a specific example of the color forming materials used with the present invention, coatings 210, 21a, 21b and 44a through e preferably comprise an encapsulated solution of p-toluene sulfinate of Michler's hydrol in a suitable solvent therefor. The acidic color forming reactive component of coatings 190, 19a, 19b and 18a through 18h preferably comprises the acid-treated bentonite-type clay material disclosed by Baxter in application Ser. No. 125,075.

The microcapsules included in coatings 190, 19a and 19b preferably contain, as the first reactive component of the second reaction system, a dithiooxamide material as described in Example 18 of U.S. Pat. No. 3,516,846. This dithiooxamide material is dissolved in an appropriate solvent as in also described in Example 18 of the '846 patent. The intended capsule fill material is then microencapsulated and the microcapsules are coated onto a sheet of paper in accordance with Example 19 of this same patent. Coatings 180, 78a and 78b preferably comprise nickel rosinate which has been coated on the respective sheets by forming a solution of nickel rosinate which is applied to the sheets and the solvents removed by drying to leave the required residue. This procedure is also described generally in Example 18 of said '846 patent.

Coatings 190, 19a and 19b in the FIGS. 1, 1A, 2 and 2A preferably include both the microencapsulated dithiooxamide material described above and the acid-treated bentonite-type clay material described earlier. In the production of coatings 190, 19a and 19b, the microcapsules may first be applied to the appropriate surface of sheets 12, 14 and 16 and to each surface of sheet 29. Thereafter, a slurry of acid-treated bentonite-type clay, may be applied to this microcapsular coating and allowed to dry.

In view of the foregoing, it can be seen that a simple and economical yet highly effective manifolded set of carbonless copying papers is set forth in several embodiments, each of which is capable of having images produced on opposite sides of its sheets.

Obviously, many modifications and variations of the invention are made possible in the light of the above teachings. It is therefore to be understood that within the scope of the appended claims the invention may be practiced otherwise than as specifically described.

I claim:

1. A manifold set of carbonless recording sheets comprising:

a stack including at least three superimposed sheets;

the initially uppermost and the middle sheets each having a coating on their respective back surfaces and the initially lowermost sheet having a coating on its front surface;

the back coating of the middle sheet comprising, as a reactive component thereof, a first reactive component of a first initially colorless color forming reaction system *being in a transferable form such that the same will be transferred from said middle sheet to an adjacent sheet in response to the application of pressure thereto,* and the front coating of the initially lowermost sheet comprising, as a reactive component thereof, a second reactive component of said first reaction system;

the front coating of the initially lowermost sheet also comprising, as a reactive component thereof, a first reactive component of a second initially colorless color forming reaction system and the back coating of the initially uppermost sheet comprising, as a reactive component thereof, a second reactive component of said second reaction system,

*one of the reactive components of the front coating of the initially lowermost sheet being in a transferable form such that the same will be transferred from said lowermost sheet to an adjacent sheet in response to application of pressure thereto and the other of the reactive components in the front coating of the initially lowermost sheet being in a non-transferable, record-receiving form,* said first and second components of the first reaction system being capable of interreacting to produce a colored mark upon coming into reactive contact, said first and second components of the second reaction system likewise being capable of interreacting to produce a colored mark upon coming into reactive contact, said first component of the first system and said second component of the *second* system being incapable of interreacting to produce a colored mark, said first component of the second system and said second component of the first system being incapable of interreacting to produce a colored mark, said middle sheet being initially disposed in overlying relationship to said lowermost sheet such that its back coating is disposed against said front coating of the lowermost sheet, whereby upon application of pressure to the stack, said back coating of the middle sheet and the front coating of the initially lowermost sheet are forced together to bring the first and second components of the first reaction system into said reactive contact to thereby produce a colored mark, said sheets being capable of rearrangement such that said initially lowermost sheet overlies said initially uppermost sheet with the front coating of the initially lowermost sheet disposed against the back coating of the initially uppermost sheet, whereby upon application of pressure to the stack, said front coating of the initially lowermost sheet and the back coating of the initially uppermost sheet are forced together to bring the first and second components of the second reaction system into said reactive contact to thereby produce another colored mark.

2. A manifold set as set forth in claim 1 wherein a coating of at least one of said sheets comprises a plurality of pressure rupturable microcapsules containing a color forming reactive component thereof, said microcapsules being rupturable upon application of said pressure to said stack.

3. A manifold set as set forth in claim 1 wherein each of said first components are contained in a plurality of pressure rupturable microcapsules which form a portion of each corresponding coating.

4. A manifold set of carbonless recording sheets comprising:

a stack including at least three superimposed sheets;

each of said sheets having front and back coatings thereon;

the coatings of the initially uppermost sheet each comprising, as a reactive component thereof, a first reactive component of a first initially colorless forming reaction system, the coatings of the middle sheet each comprising, as reactive components thereof, a second reactive component of said first reaction system and a first reactive component of a second initially colorless color forming reaction system, the coatings of said initially lowermost sheet each comprising, as a reactive component thereof, a second reactive component of said second reaction system, said first and second components of the first reaction system being capable of interreacting to produce a colored mark upon coming into reactive contact, said first and second components of the second reaction system likewise being capable of interreacting to produce a colored mark upon coming into reactive contact, said first component of the first system and said second component of the second system being incapable of interreacting to produce a colored mark, said first component of the second system and said second component of the first system being incapable of interreacting to produce a colored mark, said sheets being initially disposed with said uppermost sheet overlying said middle sheet and with the latter overlying the lowermost sheet in such manner that the back coating of the uppermost sheet is disposed against the front coating of the middle sheet and the back coating of the latter is disposed against the front coating of the lowermost sheet, whereby, upon application of pressure to the stack, said back coating of the uppermost sheet and the front coating of the middle sheet are forced together to bring the first and second components of the first reaction system into said reactive contact to thereby produce a colored mark, and said back coating of the middle sheet and the front coating of the lowermost sheet are likewise forced together to bring the first and second components of the second reaction system into said reactive contact to thereby simultaneously produce a second colored mark, said sheets being capable of rearrangement such that the front coating of the uppermost sheet is disposed against the back coating of the middle sheet and the front coating of the latter is disposed against the back coating of the lowermost sheet, whereby upon application of pressure to the stack, said front coating of the uppermost sheet and the back coating of the middle sheet are forced together to bring the first and second components of the first reaction system into said reactive contact to thereby produce another colored mark, and said front coating of the middle sheet and the back coating of the lowermost sheet are likewise forced together to bring the first and second components of the second reaction system into said reactive contact to thereby simultaneously produce another second colored mark.

5. A manifold set as set forth in claim 4 wherein a coating of at least one of said sheets comprises a plurality of pressure rupturable microcapsules containing a color forming reactive component thereof, said microcapsules being rupturable upon application of said pressure to said stack.

6. A manifold set as set forth in claim 4 wherein each of said first components are contained in a plurality of pressure rupturable microcapsules which form a portion of each corresponding coating.

7. A sheet for use in connection with a manifolded set of carbonless forms wherein at least two initially colorless reaction systems are utilized, wherein each of said systems comprises separate initially colorless first and second reactive components which are reactable when brought into reactive contact with one another to produce a colored mark and wherein the first component of each of said systems is incapable of reacting with the second component of any of the other systems to produce a colored mark, said sheet comprising:

a substrate layer; and a coating on said layer, said coating comprising an admixture of the first component of one of said systems and the second component of another of said systems,

*said first component being in a transferable form such that the same will be transfered from said sheet to an adjacent sheet in response to application of pressure thereto and said second component being in a non-transferable, record receiving form.*

8. A manifold set *which employs a sheet* as set forth in claim 7 *and wherein at least two initially colorless reaction systems are utilized, wherein each of said systems comprises separate initially colorless first and second reactive components which are reactable when brought into reactive contact with one another to produce a colored mark wherein the first component of each of said systems is incapable of reacting with the second component of any of the other systems to produce a colored mark, and* wherein each of said first components are contained in a plurality of pressure rupturable microcapsules which form a portion of each corresponding coating.

* * * * *